Patented Nov. 27, 1945

2,389,682

UNITED STATES PATENT OFFICE 2,389,682

KETONE-UREA-FORMALDEHYDE CONDENSATION PRODUCTS

Walter Nebel, Parlin, N. J., assignor to E. I. du Pont de Nemours & Company, Wilmington, Del., a corporation of Delaware No Drawing. Application October 17, 1940,
Serial No. 361,577

9 Claims. (Cl. 260—42)

This invention relates to resinous compositions and the process for making same, and more particularly to improved urea-formaldehyde resinous compositions adapted for use as decorative or protective films.

The products of the reaction and/or condensation of urea and aldehydes, particularly formaldehyde, are well known in the art. These products possess desirable properties of hardness and strength and, further, have excellent color, transparency and fastness to light. Such products have been used within recent years extensively in the field of molded plastics. Practically no use, however, had been made of them in the field of coating compositions to produce decorative and protective films until Edgar and Robinson, U. S. P. 2,191,957, disclosed the advantage of preparing resins of this type in the presence of an excess of lower aliphatic monohydric alcohol. Edgar and Robinson show that the aliphatic alcohol combines with the urea formaldehyde condensation complex and forms products which in the partially condensed stages have excellent solubility in organic solvents, and greatly improved compatibility with modifying agents such as the cellulose derivatives and other synthetic resins.

The modification of the basic urea-formaldehyde condensation products with the lower aliphatic alcohols also tended to improve the flexibility characteristics of the resinous complex. Another effect was that the stability of a partially condensed product was greatly improved, permitting its use in protective coating compositions which were to be stored for indefinite periods of time. The products of Edgar and Robinson have assumed great commercial value. The resins of the present invention are more flexible and are therefore particularly suitable for coating compositions containing nitrocellulose.

It is an object of this invention to prepare modified urea-formaldehyde condensation products suitable for use in protective coatings. A further object is the production of resins of improved solubility and compatibility characteristics. A still further object is the production of resins having greater flexibility than obtained heretofore with urea-formaldehyde condensation products. A still further object is the production of intercondensed resins having useful properties which cannot be obtained by the simple mixing of the partially condensed urea-formaldehyde resin with the resinous modifier of my preferred type. Other objects will appear hereinafter.

These objects are accomplished by the partial intercondensing of reaction products of urea and an aldehyde with those of a ketone-aldehyde reaction, in the presence of an excess of a lower aliphatic monohydric alcohol, whereby a resin solution is produced in which a portion of the alcohol is chemically attached, with the excess of the aliphatic alcohol acting as a solvent and stabilizer, and the product can through heat and/or pressure be further condensed to tough, flexible resins of great utility.

It is known that ketones react readily with formaldehyde in the presence of alkaline catalysts to form keto-alcohols, generally designated methylol ketones. Dehydration of the methylol ketones gives rise to methylene ketones and subsequent condensation leads in general to soft, often liquid resinous products. Under certain conditions, hard resins can be formed.

I have found that the inherently greater flexibility of the ketone-formaldehyde resins can be used to modify the urea-formaldehyde resins to an unexpected degree when the dehydration of the methylol derivatives of the ketone and the urea and their subsequent partial condensation is carried out simultaneously in the presence of an excess of a lower monohydric aliphatic alcohol.

By the term "excess alcohol" I mean more than the theoretical chemical equivalent of methylol groups with which the monohydric alcohol reacts.

The degree of modification of the urea-formaldehyde condensation product with the ketone-formaldehyde condensation product can be varied over wide limits. I have obtained valuable resinous products when 100 parts of the reaction products of urea and formaldehyde are intercondensed with from 10 to 800 parts of a ketone-formaldehyde reaction product. In the case of the lower concentrations of the ketone-formaldehyde condensation product, the object is to impart flexibility to the urea-formaldehyde condensation product, whereas in the case of the higher ratios the object is frequently one of hardening the ketone-formaldehyde resin.

The products of these intercondensations show properties markedly different from those secured by simple mechanical blending of the individual urea and ketone condensation products which suggest the presence of linkages between the molecules in the condensation.

Example 1

Into a copper laboratory kettle were placed

| | Grams |
|---|---|
| Methyl ethyl ketone | 238 |
| Formaldehyde (37%) | 488 |
| Sodium hydroxide (12%) | 10 |

A water-cooled reflux column was attached to the kettle and the mixture warmed for three hours at 50° C. to 60° C. To this warm reaction mixture were added

| | Grams |
|---|---|
| Dimethylol urea (water content 25%) | 480 |
| n-Butyl alcohol | 612 |
| Phthalic anhydride | 8 |

The reflux was replaced by a short water-jacketed condenser, and the mixture heated to 95° C. At this point 36 grams of toluene were added to assist in separating out the water of reaction formed by the action of the dehydrating catalyst, phthalic anhydride. This operation of separating water was carried out by attaching the delivery end of the condenser to a glass separator of conventional design. The cooling of the vapor mixture from the reaction kettle caused a splitting of the condensate into two layers of which the water layer, being the heavier, settled to the bottom of the glass separator; a connection leading from the mid-section of the separator to the reaction vessel permitted the continuous return of the substantially water-free mixture of n-butyl alcohol and toluene to the reaction kettle to assist in removing further water. The composition of the vapor ternary formed is normally

| | Percent by weight |
|---|---|
| n-Butyl alcohol | 11.1 |
| Toluene | 69.9 |
| Water | 19.0 |

The water layer which separates out on cooling to room temperature contains approximately 80% of water, 15% to 17% of n-butyl alcohol and 3% to 5% of toluol by weight.

The separation of the water layer was continued until 602 grams had been removed. At this point the distillation was continued without return of the condensate until 397 grams of a mixture of n-butyl alcohol, toluol and a small amount of water had been removed. The reaction mass was then cooled and removed for examination. It was found to comprise a solution of the resinous condensation products in n-butyl alcohol having a viscosity of 160 centipoises at 25° C. The solution had a solids content of 58.4% as determined by weighing out approximately 3 grams of solution into a shallow metal dish, having a flat bottom and a surface area of approximately 40 square centimeters. The sample was then heated for 20 hours at 100° C. It has been found necessary to carry out the total solids determinations of resins of this general type under standard conditions as the combined condensation of the resin and volatilization of excess n-butyl alcohol varies as the heating conditions change.

The resin solution, containing 58.4% solids, baked to a hard, tough film in approximately 60 minutes at 140° F. when spread in a thin layer on glass. The resin film was substantially colorless and had only the faintest trace of haze present. The product before baking was readily compatible with nitrocellulose and also with a considerable variety of alkyd resins. Addition of baking accelerators such as phosphorus pentoxide speeded up the formation of the final hard, tough product. Films having present considerable amounts of the resinous product were found to be scratch-resistant, glossy, and afforded a high degree of protection to the surfaces to which they were applied.

This resin product can be characterized best by the molecular ratio of ketone to urea used which was 1.1 to 1. Due to the extreme volatility of the methyl ethyl ketone used some is lost, so that it is probable that the final ratio was more nearly 1 to 1. A yield of 1697 grams of resin solution or an equivalent of 990 grams of solid resin was obtained.

Example 2

| | Grams |
|---|---|
| Methyl ethyl ketone | 238 |
| Formaldehyde (37%) | 243 |
| Caustic soda (12%) | 15 |

The ingredients were placed in a clean copper reaction flask fitted with a reflux condenser. The mixture was warmed for 30 minutes between 50° C. and 60° C. and then allowed to stand overnight.

In the morning a flask equipped with a reflux condenser was loaded with

| | Grams |
|---|---|
| Urea | 100 |
| Formaldehyde (37%) | 297 |
| n-Butyl alcohol | 340 |
| Caustic soda (12%) | 5 | and heated to 70–75° C. for 30 minutes. The two warm reaction mixtures were then blended in the copper reaction flask and to the mixture

| | Grams |
|---|---|
| Phthalic anhydride | 4.0 |
| Toluene | 40.0 | were added. At this point the reflux was disconnected and a straight condenser lead to a glass water-separator set up. Distillation was continued until a water layer of 416 grams had been removed, following which 172 grams of a mixture of n-butyl alcohol and toluol was distilled off.

This gave as a product a partially condensed resin solution of 662 grams having a solids content of 49.1% and a viscosity of 80 centipoises at 25° C. The resin solution had a color of 3 as determined by the A. S. T. M. test method D–39–365 reference standards and only a slight haze. Spread on a glass plate and baked at 140° F. a clear, hard, tough film was secured in approximately one hour. Addition of a trace of an accelerator such as phosphorus pentoxide permitted use of a shorter baking period and gave harder but less flexible films. Compatibility of the resin solution with nitrocellulose solutions was found to be excellent.

The ratio of urea to methyl ethyl ketone used was 1 to 2 and the films formed on baking were found to be softer and more flexible than those of Example 1, indicating further the flexibilizing effect of the ketone-formaldehyde condensation product on the urea-formaldehyde condensation product. The viscosity of the ketone-modified resin solutions has been found to be substantially lower than that of commercial urea-formaldehyde resin solutions of the same solids content and prepared under substantially equivalent conditions, e. g., the solution of Example 1 containing 58.4% solids was thinned to 55% solids with n-butyl alcohol and compared in viscosity with a commercial urea-formaldehyde-n-butyl alcohol solution of the same solids content. The respective viscosities in centipoises were 90 and 950 centipoises. The lower viscosity of the ketone-urea intercondensation products permits the formulation of coating compositions of higher solids content at spraying, dipping or brushing viscosity. Also, coating compositions prepared from the new products are even more stable on storage than the partially condensed urea-formaldehyde-monohydric alcohol condensation products.

The product of Example 1 when blended with nitrocellulose solutions and stored at 120° F. failed to show any noticeable viscosity increase in two weeks.

Thus far, the embodiment of my invention showing the effectiveness of the methyl ethyl ketone-urea-formaldehyde-n-butyl alcohol intercondensation product as a basic resin for protective coatings has been disclosed. Other lower aliphatic ketones such as acetone, methyl isobutyl ketone, methyl amyl ketone and diethyl ketone can be utilized to produce resins and the selection of a suitable product is within the scope of those skilled in the art of resin manufacture. Higher ketones such as the cyclic compound cyclohexanone, represent useful materials for my purpose.

*Example 3*

The following ingredients were placed in a glass flask and heated at 50–60° C.:

| | Grams |
|---|---|
| Cyclohexanone (commercial grade) | 294 |
| Formaldehyde (37%) | 486 |
| Sodium hydroxide (12% soln.) | 30 |

After heating for 8 hours the following material was then placed in a copper flask equipped with a condenser and a water separator at the delivery end of the condenser:

| | Grams |
|---|---|
| Above mixture | 270 |
| Crystalline dimethylol urea (water content 25%) | 267 |
| n-Butyl alcohol | 340 |
| Phthalic anhydride | 4 |
| Toluol | 20 |

Heating was started and the water layer of the condensate separated until 130 grams had been eliminated. Distillation was continued until 107 grams of toluol and n-butyl alcohol had been removed.

A resin solution of 534 grams was secured from the above reaction, having a total solids content of 55.4% and a viscosity of 128 centipoises. The resin solution had a bluish color probably from a slight copper contamination and had a color rating of 15, with only a slight haze. The molecular ratio of urea to cyclohexanone used was 1.67 to 1.0.

The resin solution when spread on a glass plate and baked for 45 minutes at 140° F. failed to harden completely giving a soft tacky resin. The addition of phosphorus pentoxide as an accelerator, gave a mixture which hardened to a very tough, tack-free film on baking at 140° F. for 45 minutes.

The resin solution blended readily with nitrocellulose solutions and a mixture having the following solids ratio:

| | Parts by weight |
|---|---|
| Nitrocellulose | 10 |
| Cyclohexanone-urea resin | 20 |
| Maleic acid modified ester gum | 20 | and applied to wood gave a glossy, hard, tough film without need of baking. The coating when dry was rubbed and polished with standard abrasives and when compared in appearance with high grade commercial wood lacquers received an excellent rating. The stability of the lacquer, as tested by studying any tendency for the viscosity to rise when heated at 120° F., was found to be excellent.

The resin solutions of the above examples represent partial condensation products. The water of reaction formed has been removed sufficiently to give a product which may be stored or used in protective finishes. The final condensation occurs after the resin solution or composition containing it has been applied to a surface and baked at a temperature sufficient to cause a rapid hardening of the composition. The addition of accelerators such as phosphorus pentoxide greatly speeds up this final condensation. Also, in certain cases it was possible to obtain a slow final condensation to give a tough film merely by air-drying the coating composition. However, the period necessary to obtain the final hardened resin is normally excessive in the case of the air-drying operation. It is necessary in the manufacture of resin solutions of this type for use in protective coatings to carry out the preliminary partial condensation to a point at which good compatibility with modifying agents occurs and with a viscosity such that high solids concentrations can be used. In this connection, the viscosity of the final coating solution is of great importance, and this viscosity must be regulated to be suitable for the particular coating operation, for example, spraying, dipping, roller-coating, impregnation, brushing, etc.

*Example 4*

| | Grams |
|---|---|
| Methyl ethyl ketone | 79 |
| Formaldehyde (37%) | 162 |
| Caustic soda (12%) | 10 |

The ingredients were placed in a glass flask of one liter capacity fitted with a water cooled reflux condenser. The mixture was refluxed for one hour at approximately 87° C.

At the same time, the following ingredients were introduced into a second glass flask equipped with a water cooled reflux condenser.

| | Grams |
|---|---|
| Melamine | 126 |
| Formaldehyde (37%) | 267 |
| n-Butyl alcohol | 367 |

This mixture was refluxed for one hour at approximately 93.5° C. Without completely cooling, the two reaction mixtures were blended and allowed to stand overnight. In the morning one-half the total charge was placed in a flask equipped with a water cooled condenser attached to which was a water separator. Twenty grams of toluol were added to the batch as a water carrier and heating started. As the temperature reached 88.5° C. distillation started. Distillation was continued until 162 grams of water had been separated, following which 66.3 grams of a mixture of toluol and n-butyl alcohol and a small amount of water distilled off. During the condensation the temperature of the batch gradually rose from 88.5° C. to 120° C. The product, a partially condensed resin solution amounted to 276 grams and had a total solids content of 57.9%. The resin solution had a viscosity of 3500 centipoises at 25° C. When the solids content was reduced to 50% using n-butyl alcohol to dilute it, a viscosity of 550 centipoises resulted. The solution had a color of 2 as determined by the A. S. T. M. test method D-39-365 reference standards and had a definite haze or cloud. Spread on a glass plate and baked for approximately one hour at 100° C., a hard brittle film was produced. No accelerator was necessary to give good baking characteristics. The ratio of methyl ethyl ketone to melamine used, was 1:0.8, with an allowance of 10% excess in the case of the methyl ethyl ketone to compensate for its volatility.

Example 5

|  | Grams |
|---|---|
| Methyl isobutyl ketone | 79 |
| Formaldehyde (37%) | 162 |
| Caustic soda (12%) | 10 |

The ingredients were placed in a clean one liter glass flask equipped with a water cooled reflux condenser, and the mixture refluxed for an hour. In a second flask were placed:

|  | Grams |
|---|---|
| Melamine | 126 |
| Formaldehyde (37%) | 267 |
| n-Butyl alcohol | 367 | and the mixture refluxed for an hour at approximately 93° C. The two reaction mixtures were blended while hot, and allowed to stand overnight. Half of the batch was then placed in a flask equipped with a water cooled condenser leading directly to a water separator. Twenty grams of toluol were added to act as a water carrier. Distillation was started and continued until 168 grams of water had been separated out. The temperature of the reaction mass at this point was 104° C. Distillation of toluol, n-butyl alcohol and some water was then continued until 123 grams had been collected. At this point the condensation was stopped. The reaction mass had reached a temperature of 120° C. at this point.

The solution of the partially condensed resin in n-butyl alcohol had the following characteristics:

| | |
|---|---|
| Weight of resin solution | 245.5 grams |
| Total solids | 59.6% by weight |
| Viscosity at 59.6% solids | 24,000 centipoises at 25° C. |
| Viscosity at 50% solids | 1700 centipoises at 25° C. |
| Color | 2 |
| Cloud | Slight |

On baking a thin film of the resin solution on glass, a hard, brittle film was produced, having excellent color and gloss.

N-butyl alcohol has been used as the modifying monohydric alcohol in the examples, but other monohydric alkyl alcohols can be used in forming useful resins including methyl, ethyl, propyl, amyl and octyl alcohols. The use of the higher alcohols is not preferred in most instances since in general the products are not as soluble as those prepared from the lower alcohols. Also, the films tend to retain sufficient of the monohydric alcohol to give a false or temporary plasticizing effect which is often undesirable. Isobutyl alcohol and n-butyl alcohol represent the preferred modifying alcohols giving very soluble partial condensation products combined with almost an ideal rate of volatility for coating compositions. The monoalkyl ethers of ethylene glycol have also been found to be useful in reactions of this type due to their reacting as monohydric alcohols.

One of the most important stages in the condensation process is the splitting out of water; for example, in Example 1, besides the water formed during the dehydration of the methylol derivatives, considerable quantities were introduced with the formaldehyde, the water-wet dimethylol urea and a smaller amount from the caustic soda solution. Also, the commercial grades of formaldehyde have present from 6 to 15% of methanol, the presence of which greatly complicates the removal of water from the reaction mixture.

The use of methyl, ethyl, propyl or butyl alcohol or the monoalkyl ethers of the ethylene glycol makes it difficult to remove this water unless so-called "water-carriers" are added. These act by reducing the water solubility of the condensed vapors distilled off during the reaction, causing the water to split out from the major portion of the condensate. Gasoline, benzol and toluol represent volatile water-insoluble organic liquids suitable for this purpose.

While the use of a water carrier in general speeds up and simplifies the process of water removal, the presence of such a material is not always necessary; for example, if a grade of formaldehyde substantially free from methanol is used and the monohydric alcohol has a low water solubility, the presence of a "water-carrier" becomes unnecessary, provided that a suitable excess of the monohydric alcohol is used. A vacuum distillation procedure may also be used to assist in the removal of the water, and by virtue of the lower temperature necessary to produce effective distillation with the vacuum, excessive condensation and its accompanying viscosity rise can be avoided.

It is essential, therefore, that the manufacture of the resins be carried out in a manner and to a degree to give a suitable end product. The examples illustrate how such useful products can be produced but are limitative only in that under the conditions used, the time of condensation, and the degree of water removal, gave products which have been found to be suitable for the preparation of coating compositions for wood, leather, fabric, paper, metal, etc.

The specific ketone used depends upon various factors such as the speed and ease of reaction with formaldehyde, and the hardness, flexibility and compatibility characteristics of the final product. The speed of reaction is greatest in the case of acetone but the reaction is difficult to control, and there is a great tendency to form a variety of side products. In the case of methyl ethyl ketone, we still have a high reaction speed but one more readily controllable; also fewer side reactions occur. It has been found preferable to use a ketonic body having at least one available methyl group, although resins may readily be prepared from a ketone such as diethyl ketone, higher aliphatic ketones and cyclohexanone. Mixtures of ketones can also be utilized to obtain desirable characteristics.

Urea is preferred, although in some instances it may prove desirable to replace part or all of the urea with thiourea, one of the substituted ureas or an aminotriazine, such as melamine.

The resinous products of my invention have been found to be compatible with a wide series of modifying agents including other film-forming materials as the cellulose derivatives, e. g., cellulose nitrate, ethyl cellulose; synthetic resins, e. g., ester gum, polyhydric alcohol-polybasic acid resins, and various vinyl resins. They are also compatible with many plasticizers. Pigments can be dispersed in the coatings and dyes, metallic powders, waxes, etc., added for special purposes.

The addition of accelerators to speed the hardening or final condensation and to permit the use of low baking temperatures is an important part of the correct usage of these resins. In addition to the phthalic anhydride noted in the examples as a catalyst, other materials of an acidic nature such as benzoic and similar monocarboxylic acids, maleic acid, adipic acid and similar dicarboxylic acids as well as tricarboxylic acids as citric, also acid salts and acid resins such as rosin, etc. may be used. Further inorganic acids as hydrochloric, sulfuric and phosphoric acid are satisfactory. In addition, certain inorganic salts such as mercuric chloride, aluminum chloride, stannic chloride as well as the halogens as bromine or iodine may be used; also peroxides such as benzoyl peroxide.

Among the uses to which coating compositions containing the resinous products may be put are protective and decorative finishes for metal, wood, glass, hard rubber, molded plastics, synthetic resin products, fabrics, leather, non-fibrous pellicles such as those derived from cellulose and cellulose derivatives, starch, gelatin, zein and clay; paper, floor coverings, abrasive sheet materials. Other uses include adhesives, impregnating compositions and insulating compounds.

From the foregoing description, it can be seen that I have developed a new class of resins having properties especially adapted for use in the formulation of coatings for wood, metal, cloth, leather, and the like. Through variations in the ratios of ketone and urea as well as the selection of the specific ketone used, the flexibility and hardness of the final condensed products can be controlled over a wide range. The carrying out of the intercondensation of the resin in the presence of an excess of a lower aliphatic monohydric alcohol increases the controllability of the resinification and by the blocking action of the alcohol, the intermediate, useful condensation products possess exceptional compatibility characteristics with a wide variety of ingredients, including a great number commonly used in coating compositions of the present and prior art. The resins produced show a low inherent viscosity characteristic permitting high solids type of coating compositions at spraying, brushing or dipping viscosities. The resins are also inherently light colored. The general excellent compatibility with nitrocellulose solutions permits the formulation of new or improved coatings not previously attainable with resins of the urea-formaldehyde type.

As many apparently widely different embodiments of this invention may be made without departing from the spirit and scope thereof, it is to be understood that this invention is not limited to the specific embodiments except as defined in the appended claims.

I claim:

1. The process of preparing a solution of a resinous intercondensation product which comprises condensing a mixture of 1 part of dimethylol urea with between about 0.1 and 8 parts of methylol ketone in the presence of an acidic catalyst and a lower aliphatic monohydric alcohol which is present in excess of the theoretical chemical equivalent of the methylol groups with which the monohydric alcohol reacts, said methylol ketone comprising the reaction product of 1 mol of formaldehyde with between about 1 and 0.5 mols of a mono-ketone selected from the group consisting of methyl-alkyl ketone wherein the alkyl radical contains less than 6 carbon atoms and cyclohexanone.

2. The process of claim 1 in which a volatile water insoluble hydrocarbon is added as a water carrier to assist in the removal of the water formed during condensation.

3. The process of claim 1 in which the ketone is acetone.

4. The process of claim 1 in which the ketone is methyl ethyl ketone.

5. The process of claim 1 in which the ketone is cyclohexanone.

6. The process of claim 1 in which the lower aliphatic monohydric alcohol is butyl alcohol.

7. The process of preparing a solution of a resinous intercondensation product which comprises condensing the mixture of 1 part of dimethylol urea with between about 0.1 and 8 parts of methylol ketone in the presence of an acidic catalyst and a lower aliphatic monohydric alcohol which is present in excess of the theoretical chemical equivalent of the methylol groups with which the monohydric alcohol reacts, simultaneously distilling off a mixture of alcohol and water and continuing the condensation and distillation until substantially all of the free water has been removed, said methylol ketone comprising the reaction product of 1 mol of formaldehyde with between about 1 and 0.5 mols of a mono-ketone selected from the group consisting of methyl-alkyl ketone wherein the alkyl radical contains less than 6 carbon atoms and cyclohexanone.

8. The process of claim 7 in which a non-reactive volatile hydrocarbon is added as a water carrier.

9. A resin solution prepared by the process of claim 1.

WALTER NEBEL.